(12) United States Patent
Damour et al.

(10) Patent No.: US 6,231,239 B1
(45) Date of Patent: May 15, 2001

(54) BEARING BUSH WITH CENTER FLANGE

(75) Inventors: Philippe Damour, Frankfurt; Klaus Kirchhof, Niedernhausen; Stephan Deusser, Wiesbaden, all of (DE)

(73) Assignee: Glyco-Metall-Werke Glyco B.V. & Co. KG, Wiesbaden (DE)

( * ) Notice: Subject to any disclaimer, the term of this patent is extended or adjusted under 35 U.S.C. 154(b) by 0 days.

(21) Appl. No.: 09/200,690

(22) Filed: Nov. 27, 1998

(30) Foreign Application Priority Data

Nov. 29, 1997 (DE) .................................... 197 53 111

(51) Int. Cl.⁷ ........................................ F16C 17/02
(52) U.S. Cl. ............................... 384/275; 384/296
(58) Field of Search ................................ 384/275, 296, 384/295, 276, 273

(56) References Cited

U.S. PATENT DOCUMENTS

| 1,793,874 | 2/1931 | Skillman . |
| 3,351,999 | 11/1967 | McCloskey . |
| 4,048,703 | 9/1977 | Lehnhart . |
| 4,231,623 | 11/1980 | Kaufman . |
| 4,796,457 | 1/1989 | Iijima . |

FOREIGN PATENT DOCUMENTS

| 841087 | 7/1949 | (DE) . |
| 195349 | 3/1962 | (DE) . |
| 2406460 | 8/1975 | (DE) . |
| 1 458 047 | 12/1976 | (GB) . |

*Primary Examiner*—Lenard A. Footland
(74) *Attorney, Agent, or Firm*—Reising, Ethington, Barnes, Kisselle, Learman & McCulloch, P.C.

(57) ABSTRACT

A bearing bush that can be installed without any auxiliary components and ensures a secure fit has a backing which comprises at least one layer, an overlay (4), on its inner surface and at least one flange (6,6*a*,6*b*) in the form of a circumferential closed bead provided at a distance from the bush ends. The bearing bush is suitable, inter alia, for flexible joints and pedal bearing systems. The method of producing such a bush takes as its starting point a prefabricated bearing bush (1), the inner surface of the backing (3) of which is exposed in at least one area (5,5*a*,5*b*) spaced from the bush ends. An internal mandrel is inserted into the bearing bush (1) and the bearing bush is held around its outer surface, at least one gap (23) being left opposite to the exposed area (5,5*a*,5*b*). The bearing bush is then compressed in the axial direction, the material is thereby displaced into the gap (23,23') to form the flange (6).

2 Claims, 5 Drawing Sheets

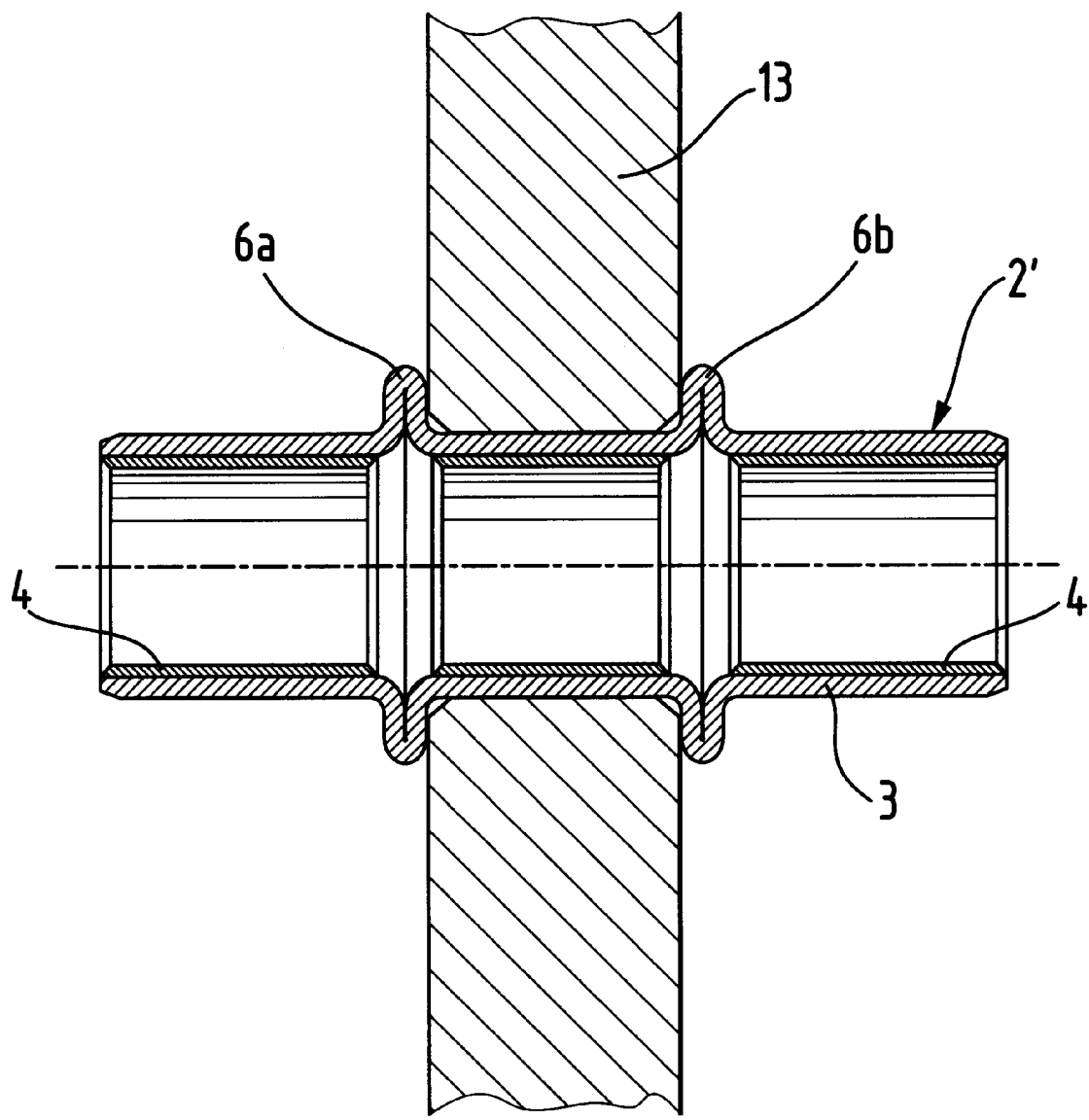

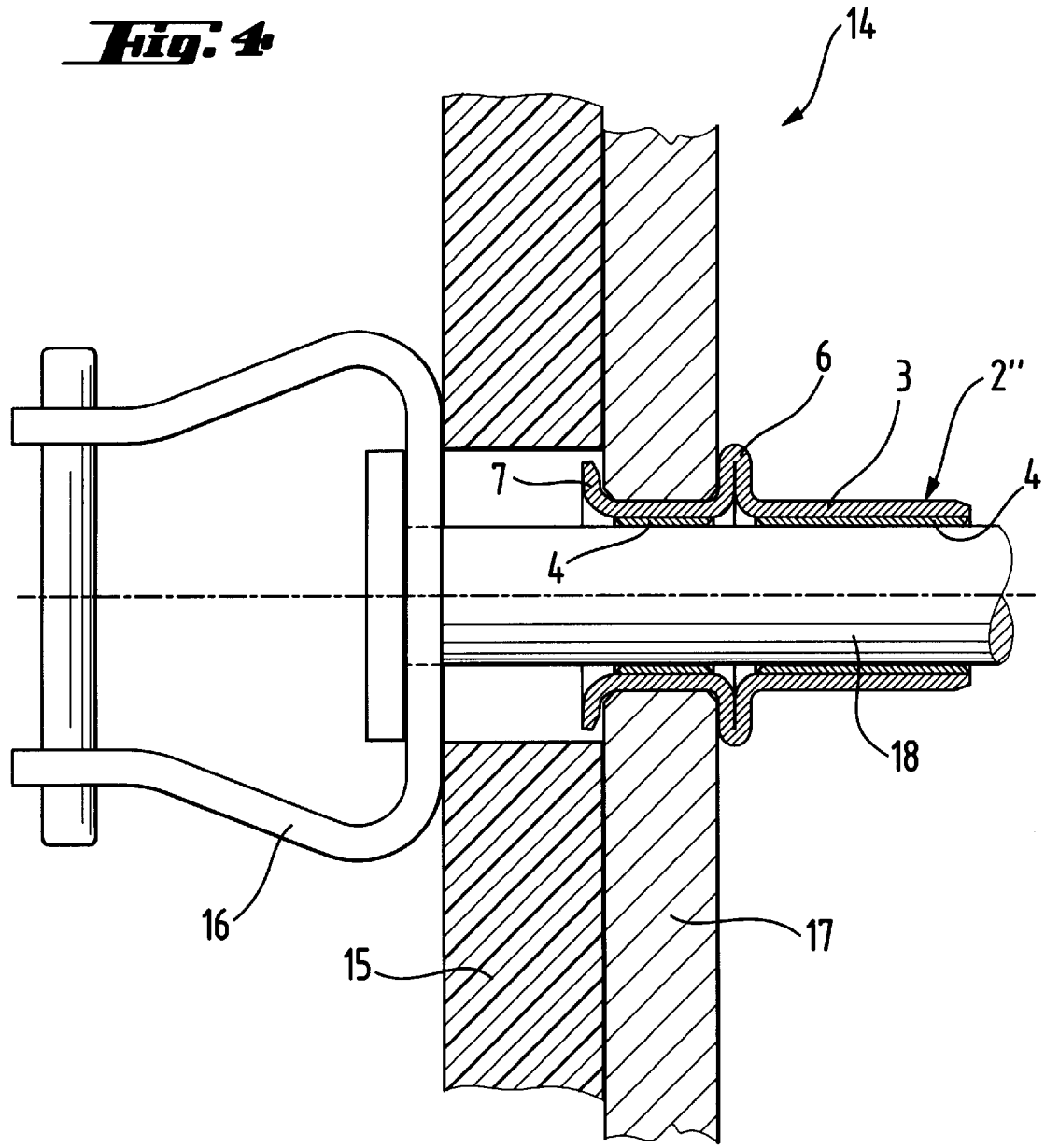

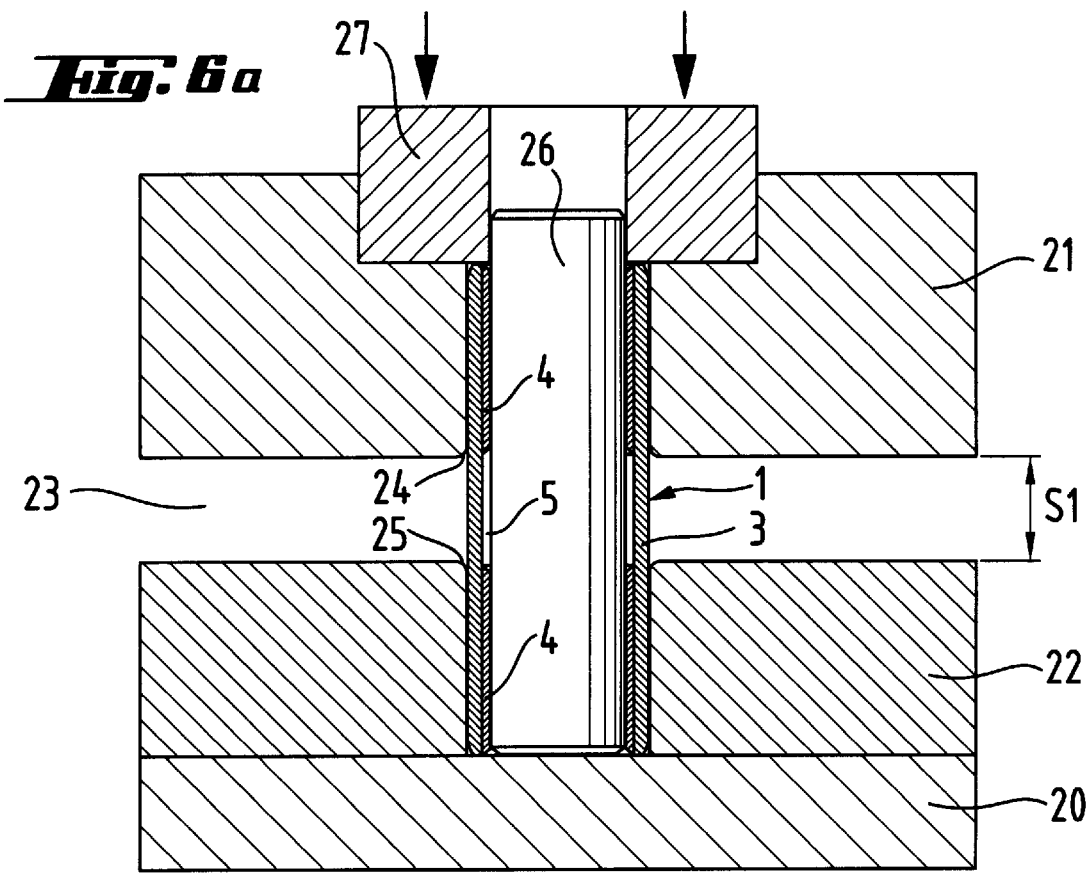
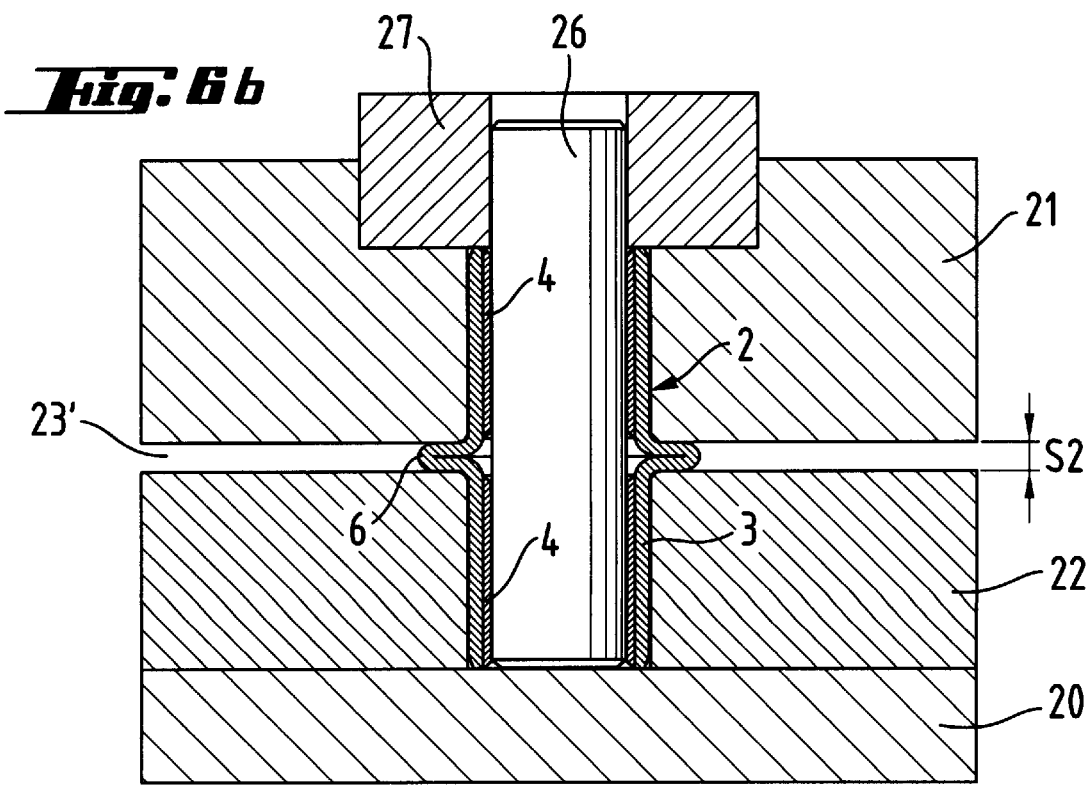

BEARING BUSH WITH CENTER FLANGE

BACKGROUND OF THE INVENTION

1. Field of the Invention

The invention relates to a bearing bush with a backing comprising at least one layer, in particular an overlay, on its inner surface, as well as to the use and method for the production thereof.

2. Description of Related Art

Bearing bushes have many uses, e.g. in door hinges, as roller bearing systems, pedal bearings in flexible joints etc.

Depending on the use to which the bushes are to be put and their installation position, said bushes comprise one or two flanges (end flanges) at one or both bush ends. The bushes are installed by interference fit, whereby an immovable fit is ensured. However, this is only achieved if the bush is inserted into an appropriately solid component.

If bushes are to be used in rubber components, the fit is markedly poorer. To remedy this, it has hitherto been attempted to roughen or knurl the outer surface. The resilient material had hitherto to be vulcanised onto the bush, wherein damage could occur to the sliding material of the bush owing in part to the high temperatures occurring during this process. Moreover, where end flanges were to be provided, these had to be flanged later.

For other applications, such as pedal bearings or the like, where the bushes have to be arranged in a pedal lever, additional guide elements, such as bosses, are required, into which two flanged bushes are inserted. This is particularly necessary when the wall thickness of the pedal lever is less than the axial length of the bushes.

A ball bearing system is known from U.S. Pat. No. 3,351,999 which comprises an appropriately shaped bush consisting of a porous metal impregnated with a lubricant. To produce the ball bearing system, a cylindrical bush is inserted together with the ball into a holding device slotted on the outside. By an upsetting process, the bush, and thus also the holding device, is given a round contour, wherein, owing to the external slot, the bush undergoes slight deformation, which is intended to assist fixing in the holding device. In the area of the deformation, the bush does not adjoin the ball, because the deformation does not cause the inner surfaces of the bead-shaped deformation to adjoin each other. The oblique outer surfaces of the deformed areas do not provide the bush with a secure fit.

A plain pedal bearing is known from DE-PS 841 087, in which the bush, in which a tube is mounted, may follow the rocking motion of the tube to a limited degree. To limit the rocking motion, the bush comprises an outwardly directed bead, which may move in a recess provided in an annular component surrounding the bush. The bush consists of steel and does not comprise any sliding coating. The bead is open on the inside and comprises radial slots distributed around its circumference, whereby the stability of the bead is considerably weakened, such that a bush of this type is not suitable for rigid installation with lateral loading, because with time the bush loosens and leaves its original installation position.

U.S. Pat. No. 1,793,874 describes a bearing comprising a curved bush in which a sliding web is inserted. The bush is surrounded by a supporting or holding ring, which comprises one or two bead-type deformations on its outside for fixing in a housing. A sliding web is also arranged between the bush and the holding device, such that the bush is mounted movably in the holding device. This bearing system is complex and expensive owing to the number of components and additionally requires a correspondingly large amount of space.

SUMMARY OF THE INVENTION

The object of the invention is therefore to provide a bearing bush which may be installed without auxiliary components and provides a secure fit, in particular in conjunction with resilient components. It is also the object of the invention to provide an appropriate production method for such bearing bushes.

This object is achieved with a bearing bush in which at least one flange (center flange) in the form of a circumferential closed bead is provided at a distance from the bush ends.

A closed bead or closed flange is to be understood to mean a bead or flange in which the inner surfaces are mutually adjacent. In this way, the flange is not only space-saving, but also more stable than beads with cavities (so-called open beads).

The outer surfaces of the flange are preferably oriented so as to be parallel to the longitudinal axis of the bearing bush. This has the advantage that the flange lies flat against the component in which the bearing bush is installed. Fixing thereof is thereby improved.

The radial extension r of the bead is preferably greater than its axial extension a. Fixing to or in a component is thereby improved further and detachment from the component is prevented.

One or more center flanges permit the achievement of a defined installation position without auxiliary components. Thus, for example, a component whose material thickness is less than the axial length of the bush may be arranged between two center flanges.

If one or two end flanges are provided, it is possible, for example, to achieve asymmetric fixing of the component. Several components may also be connected with one bush, if the bush comprises a corresponding number of flanges, whether centre and/or end flanges.

When used with components of resilient materials, the centre flange serves in fixing, such that additional measures, such as roughening of the outer surface of the bush, are not necessary.

Bearing bushes of this type may be used as an insert for a roller of resilient material, in particular of rubber.

Another use to which a bearing bush with two center flanges may be put is as a pedal bearing system. A pedal bearing system according to the invention is characterised in that the boss and bushes take the form of a bush with two center flanges. The pedal lever is arranged or fixed between the two centre flanges. The advantage of this pedal bearing system consists in the fact that, instead of the conventional three components—a boss and two flanged bushes—only one component is required, namely the bush according to the invention with two center flanges, whereby the production and assembly costs may be lowered.

A bearing bush with at least one center flange and at least one end flange may be used as a bearing system for a flexible joint, in particular for a steering column.

The production method takes as its starting point a bearing bush produced according to conventional methods, which, however, exhibits the peculiarity that the inner surface of the backing is exposed in at least one annular area spaced from the bush ends. The center flange is produced in this exposed area during the production process proper.

As a rule, this prefabricated bearing bush is not provided with the centre flange(s) until subjected to further processing, in the course of which, depending on the use to which it is to be put, it is connected with further components.

This prefabricated bearing bush may also already be provided with one or two end flanges.

The production method is characterised in that such a prefabricated bearing bush is used, the backing of which is exposed in at least one area spaced from the bush ends, in that an internal mandrel is inserted into this bearing bush, in that this bearing bush is held around its outer surface, at least one gap being left opposite to the exposed area, and in that the bearing bush is upset in the axial direction, the material thereby being displaced into the gap to form a flange. If several center flanges are to be produced, a die should be used which comprises an appropriate number of gaps, in which the center flanges may be formed.

BRIEF DESCRIPTION OF THE DRAWINGS

Exemplary embodiments of the invention are described in more detail below with the aid of the drawings, in which:

FIG. 3 shows a bush with two center flanges in the installed state, FIG. 4 shows a flexible coupling with a bush according to another embodiment.

DETAILED DESCRIPTION OF THE PREFERRED EMBODIMENT

Figure 1:
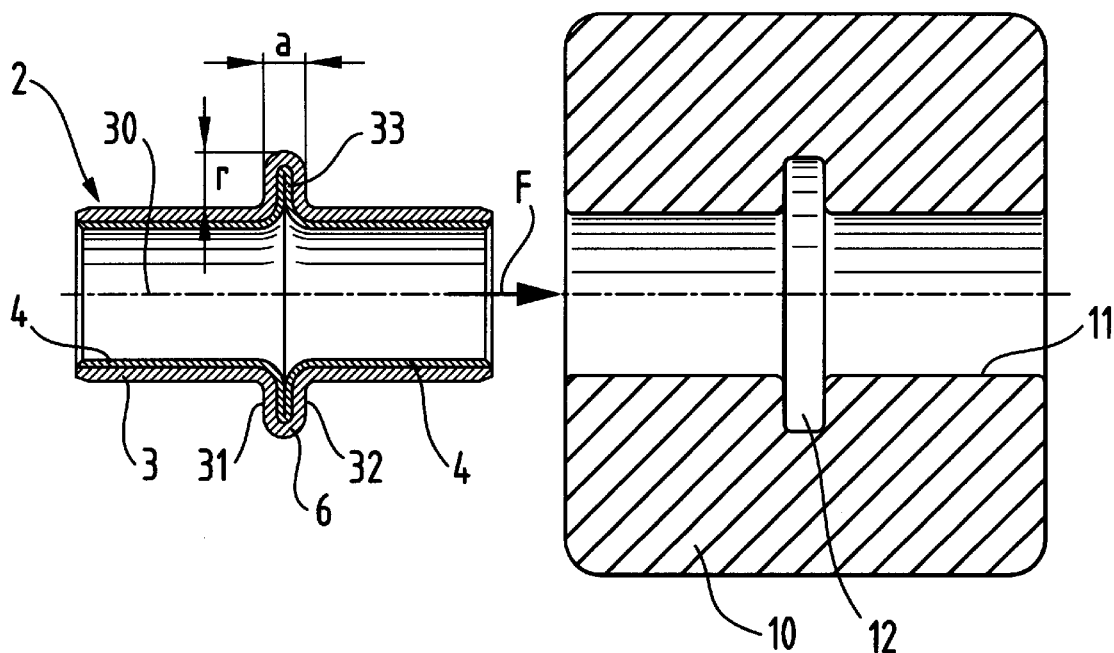
FIG. 1 is a sectional view of a bush with a centre flange prior to insertion into a rubber roller.

FIG. 1 shows a bearing bush 2 with a center or intermediate flange 6. The bush 2 includes a metallic backing 3 having a generally cylindrical body extending between axially opposite ends and provided with at least one layer of bearing material comprising an overlay 4 on its inner surface. Overlay material is also present in the area of the center flange. Two axially opposed inner surfaces 33 of the flange 6, which are formed by the overlay material, lie directly against each other (i.e., they contact one another) without any cavity between them. Two axially opposed outer surfaces 31 and 32 of the flange 6 extend perpendicularly to the longitudinal axis 30 of the bearing bush 2. The radial extension r of the flange (i.e., the predetermined distance that the flange extends radially outwardly of the body of the backing 3) is greater than the axial extension a (i.e., the predetermined distance between the outer surfaces 31,32).

Figure 2:
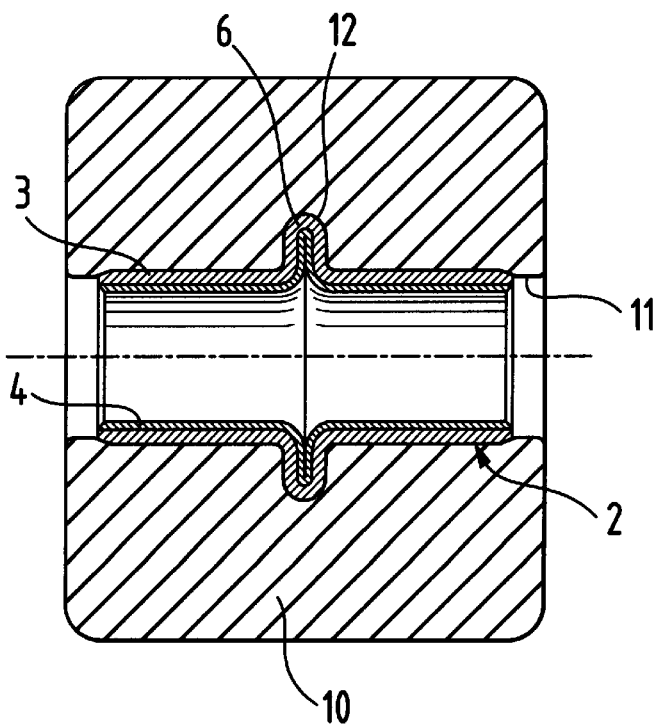
FIG. 2 shows the bush of FIG. 1 in the inserted state.

This bush 2 of this first embodiment is provided for the bearing system of a rubber roller 10, which comprises a receptacle 11 and a central recess 12. As shown in FIG. 2, the bush 2 is forced into the rubber roller 10 (arrow F) until the center flange 6 snaps into the recess 12. The position of the bush 2 is defined by the recess 12 and the center flange 6, wherein the flange 6 simultaneously determines the position of the bush. The bearing bush cannot twist or slip out during operation as a running wheel or the like.

FIG. 3 shows another embodiment of a bearing bush 2', which likewise comprises a backing 3 with an overlay 4 on the inner surface. This bush 2' comprises two center flanges 6a and 6b, between which there is arranged a plate, for example a pedal lever 13. No overlay 4 is present in the area of the center flanges 6a, 6b. While, in the prior art, a tubular component was additionally necessary, which was connected with the pedal lever 13 and into which two individual bushes had then to be inserted, only a single component, namely the bearing bush 2', is now used.

FIG. 4 shows a flexible joint 14, which comprises a cardan joint support 16, a steering column element 17 and a resilient disk 15 between these two components. The components 16 and 17 are connected together by means of a bolt 18, which is inserted in a bearing bush 2". The resilient disk 15 deforms under load, such that the bolt 18 may effect both axial and rotary motion. To this end, it is necessary for the bolt to be guided in the bush 2" over the majority of its length. Since, however, the component 17 exhibits relatively low material thickness, it is necessary for the bush 2' to project considerably with respect to the component 17. In the prior art, auxiliary components would be required for this purpose, into which appropriate bushes with end flanges would then have to be inserted. In the embodiment shown here, only one bearing bush 2" is necessary, which comprises a center flange 6 and an end flange 7. The distance between end flange 7 and center flange 6 is conformed to the material thickness of the steering column element 17. Fixing is here effected asymmetrically.

Figure 5A:
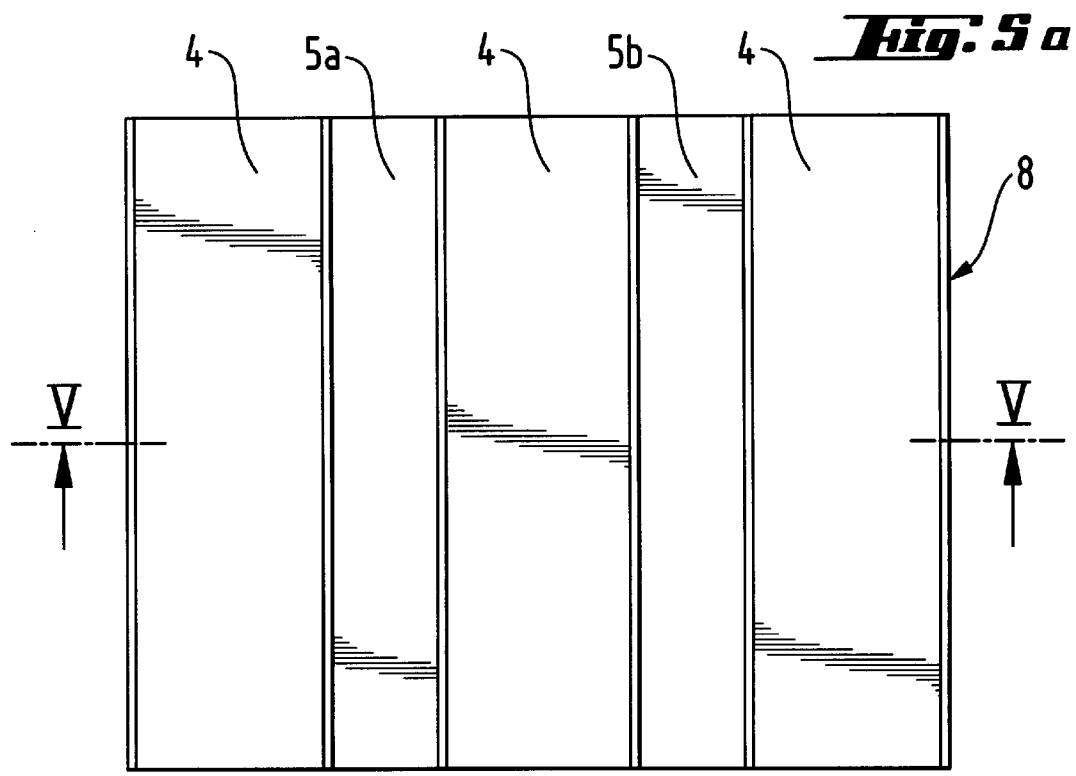
FIG. 5a is a plan view of a sheet metal blank for producing a bush.

FIG. 5a is a plan view of a sheet metal blank 8, which is provided for the production of a bearing bush with two center flanges. The sheet metal blank accordingly comprises exposed areas 5a and 5b, in which the coating providing the overlay 4 has been removed to expose the inner surface 4 of the backing 3. It is also possible to effect coating of the sheet metal blank 8 only in the appropriate areas, such that the areas 5a and 5b are left exposed.

Figure 5B:
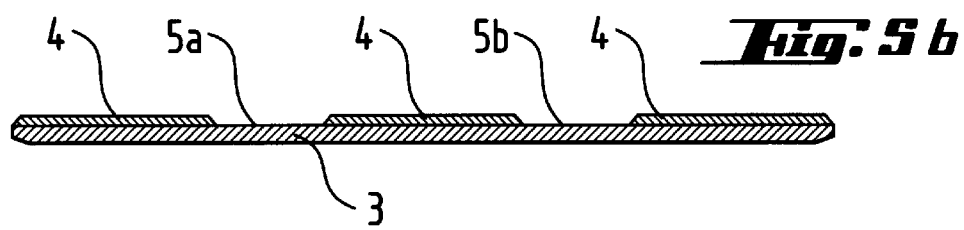
FIG. 5b shows a section along line V—V through the sheet metal blank shown in FIG. 5a, FIG. 5c shows a section through a bush produced from the sheet metal blank shown in FIG. 5a, and FIGS. 6a+6b show a vertical section through the bush and die illustrating the production method.

FIG. 5b shows a section through the sheet metal blank 8 along line V—V, such that the exposed areas 5a and 5b are clearly visible as grooves.

Figure 5C:
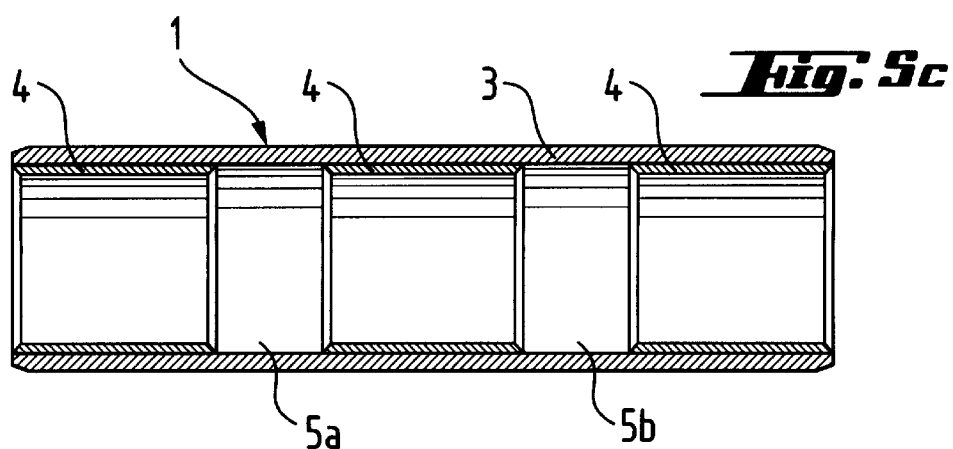

FIG. 5c shows a bush made from this sheet metal blank 8, which is used as a prefabricated bush during the production process proper, as will be described in relation to FIGS. 6a and 6b.

The die shown in FIG. 6a comprises a base plate 20 and two rings 21 and 22 arranged one above the other. These rings 21 and 22 hold the prefabricated bearing bush 1 around its outer surface, wherein the two rings 21 and 22 are arranged in spaced relationship to each other, such that a gap 23 remains between the two rings. In the area of the gap 23, 25 the rings 21, 22 comprise rounded edges 24 and 25. The gap 23 is arranged in the region of the exposed area 5, because it is in this region that the center flange will be formed.

Inside the prefabricated bearing bush 1 there is located an internal mandrel 26, which is intended to prevent the material of the bearing bush 1 from being displaced inwards during the subsequent upsetting process. An upsetting ring 27 is positioned on the end face of the bearing bush 1 and pressed downwards together with the upper ring 21, as shown in FIG. 6b. The backing material 4 is then forced into the gap 23', which is diminishing continuously in size, the bead 6 thereby being formed. The gap 23 diminishes in size during this upsetting process from the width S1 to the width S2.

The rounded portions 24 and 25 prevents the backing material 4 from being damaged in the area of the bead 6 by a sharp edge, which would impair the stability of the bead 6. The inner surface of the bush 2 is virtually completely covered with overlay material even in the area of the bead 6 in its final form, because most all of the uncoated backing material has been used to form the bead 6. After this production step, the upsetting ring 7, the internal mandrel 6 and the upper ring 21 are removed and the bush 2 according to the invention with the center flange 6 may be taken out.

If a bearing bush with several center flanges is to be produced, a die is required which comprises several rings, such that a corresponding number of gaps 23 is available. The upsetting process then proceeds accordingly. End flanges 7 may be formed as may be required for a particular application, such as that illustrated in FIG. 4.

Obviously, many modifications and variations of the present invention are possible in light of the above teachings. It is, therefore, to be understood that within the scope of the appended claims wherein reference numerals are merely for convenience and not in any way intended to be limiting, the invention may be practiced otherwise than as specifically described.

What is claimed is:

1. A bearing bush comprising:
   a metallic backing having a generally cylindrical body extending between axially opposite ends and including an inner surface;
   at least one layer of bearing material applied to said inner surface of said body; and
   at least one intermediate upset flange of said backing projecting radially outwardly of said body intermediate said ends thereof, said inner surface of said backing in the region of said intermediate flange portion being free of said bearing material.

2. The bearing bush of claim 1 wherein said intermediate flange comprises a circumferentially continuous closed bead portion of said backing spaced from said ends thereof.

\* \* \* \* \*

UNITED STATES PATENT AND TRADEMARK OFFICE
CERTIFICATE OF CORRECTION

PATENT NO. : 6,231,239 B1
DATED : May 15, 2001
INVENTOR(S) : Philippe Damour et al.

It is certified that error appears in the above-identified patent and that said Letters Patent is hereby corrected as shown below:

Column 2,
Line 40, change "centre" to -- center --.

Column 3,
Line 23, change "centre" to -- center --.

Column 4,
Line 51, before "the" (first occurrence), delete "25".

Signed and Sealed this

Twenty-fifth Day of December, 2001

Attest:

*Attesting Officer*

JAMES E. ROGAN
*Director of the United States Patent and Trademark Office*